United States Patent
Araki et al.

(10) Patent No.: US 11,887,757 B2
(45) Date of Patent: Jan. 30, 2024

(54) INSULATED ELECTRIC WIRE AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kenichiro Araki, Yokkaichi (JP); Toyoki Furukawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 179 days.

(21) Appl. No.: 17/426,530

(22) PCT Filed: Jan. 17, 2020

(86) PCT No.: PCT/JP2020/001453
§ 371 (c)(1),
(2) Date: Jul. 28, 2021

(87) PCT Pub. No.: WO2020/158445
PCT Pub. Date: Aug. 6, 2020

(65) Prior Publication Data
US 2022/0102026 A1    Mar. 31, 2022

(30) Foreign Application Priority Data

Jan. 30, 2019 (WO) .................. PCT/JP2019/003195
Jan. 30, 2019 (WO) .................. PCT/JP2019/003196
Dec. 3, 2019 (JP) .................. 2019-219009

(51) Int. Cl.
H01B 7/285 (2006.01)
H01B 7/00 (2006.01)

(52) U.S. Cl.
CPC .......... *H01B 7/285* (2013.01); *H01B 7/0045* (2013.01)

(58) Field of Classification Search
CPC .......... H01B 7/25; H01B 7/282; H01B 7/285; H01B 7/0047; B60R 16/0207; H01R 4/70; H01R 4/72
See application file for complete search history.

(56) References Cited

U.S. PATENT DOCUMENTS 2,396,702 A    3/1946 Johnson et al.
3,639,567 A    2/1972 Hervig
(Continued)

FOREIGN PATENT DOCUMENTS

CA    2202191 A1    10/1997
CN    87102361 A    10/1987
(Continued)

OTHER PUBLICATIONS

Feb. 25, 2020 International Search Report issued in International Patent Application No. PCT/JP2020/001453.
(Continued)

*Primary Examiner* — Paresh Paghadal
(74) *Attorney, Agent, or Firm* — Oliff PLC

(57) ABSTRACT

An insulated electric wire that has a superior water-stopping performance and has a configuration in which, even if water enters the insulated electric wire, the water is unlikely to stay inside the insulated electric wire, and a wire harness containing such an insulated electric wire. An insulated electric wire contains: an exposed portion in which an insulation covering is removed from the outer circumference of a conductor; in which the insulation covering covers the outer (Continued)

circumference of the conductor, and a water-stopping portion that is provided in an area extending from a part of the exposed portion to a part of the first covered portion, and in which gaps between the elemental wires constituting the conductor are filled with a water-stopping agent. A region of the second covered portion is a non-waterproof end that has a void between the elemental wires and/or between the conductor and the insulation covering.

7 Claims, 5 Drawing Sheets

(56) References Cited

U.S. PATENT DOCUMENTS

| | | | |
|---|---|---|---|
| 3,737,557 A | 6/1973 | Verne et al. | |
| 4,361,507 A | 11/1982 | Bourland | |
| 4,978,694 A | 12/1990 | Vincent et al. | |
| 5,281,757 A | 1/1994 | Marin et al. | |
| 5,902,849 A | 5/1999 | Heucher et al. | |
| 7,952,020 B2 | 5/2011 | Yamamoto et al. | |
| 9,853,342 B2 | 12/2017 | Henry et al. | |
| 9,949,392 B1 | 4/2018 | Ushiro et al. | |
| 2006/0063418 A1 | 3/2006 | Motzigkeit | |
| 2007/0007038 A1 | 1/2007 | Cox et al. | |
| 2008/0283268 A1 | 11/2008 | Iwasaki et al. | |
| 2010/0212936 A1 | 8/2010 | Arai | |
| 2011/0048762 A1 | 3/2011 | Sawamura | |
| 2012/0097414 A1 | 4/2012 | O'Sullivan et al. | |
| 2012/0217036 A1 | 8/2012 | Kuriyagawa | |
| 2014/0299353 A1 | 10/2014 | Saito | |
| 2015/0349473 A1 | 12/2015 | Montena | |
| 2016/0027552 A1 | 1/2016 | Kuriyagawa et al. | |
| 2016/0260523 A1 | 9/2016 | Aragiri | |
| 2017/0243673 A1 | 8/2017 | Nakashima et al. | |
| 2019/0096543 A1 | 3/2019 | Itou et al. | |
| 2020/0286648 A1 | 9/2020 | Furukawa | |

FOREIGN PATENT DOCUMENTS

| | | | |
|---|---|---|---|
| CN | 1365123 A | 8/2002 | |
| CN | 1465617 A | 1/2004 | |
| CN | 101248558 A | 8/2008 | |
| CN | 102598161 A | 7/2012 | |
| CN | 103119662 A | 5/2013 | |
| CN | 103907161 A | 7/2014 | |
| CN | 105122382 A | 12/2015 | |
| CN | 106898419 A | 6/2017 | |
| CN | 206370303 U | 8/2017 | |
| CN | 107851491 A | 3/2018 | |
| CN | 109065232 A | 12/2018 | |
| CN | 109074914 A | 12/2018 | |
| DE | 3708216 A1 | 9/1988 | |
| DE | 202012010582 U1 | 12/2012 | |
| DE | 102011083952 A1 | 4/2013 | |
| DE | 112019006772 T5 | 10/2021 | |
| EP | 0332821 A2 | 9/1989 | |
| EP | 0720179 A2 | 7/1996 | |
| FR | 2472820 A1 | 7/1981 | |
| FR | 2500202 A1 | 8/1982 | |
| JP | S53-014169 A | 2/1978 | |
| JP | 362-40406 A | 2/1987 | |
| JP | H07-105746 A | 4/1995 | |
| JP | H08-335411 A | 12/1996 | |
| JP | H09-102222 A | 4/1997 | |
| JP | H09-204822 A | 8/1997 | |
| JP | H10-51935 A | 2/1998 | |
| JP | H10-204227 A | 8/1998 | |
| JP | H11-224541 A | 8/1999 | |
| JP | 2000-011771 A | 1/2000 | |
| JP | 2000-082834 A | 3/2000 | |
| JP | 2003-051217 A | 2/2003 | |
| JP | 2004221047 A | 8/2004 | |
| JP | 2004355897 A | 12/2004 | |
| JP | 2005-019392 A | 1/2005 | |
| JP | 2005-032621 A | 2/2005 | |
| JP | 2005048080 A | 2/2005 | |
| JP | 2006032127 A | 2/2006 | |
| JP | 2006074068 A | 3/2006 | |
| JP | 2007-134137 A | 5/2007 | |
| JP | 2007-141569 A | 6/2007 | |
| JP | 2007-226999 A | 9/2007 | |
| JP | 2007-287647 A | 11/2007 | |
| JP | 2007-317480 A | 12/2007 | |
| JP | 2008-117616 A | 5/2008 | |
| JP | 2008123712 A | 5/2008 | |
| JP | 2008226487 A | 9/2008 | |
| JP | 2009-135073 A | 6/2009 | |
| JP | 2009231099 A | 10/2009 | |
| JP | 2010113953 A * | 5/2010 | ............ Y02A 30/14 |
| JP | 2010114027 A | 5/2010 | |
| JP | 2010136485 A | 6/2010 | |
| JP | 2010154733 A | 7/2010 | |
| JP | 2010-231978 A | 10/2010 | |
| JP | 2011-096567 A | 5/2011 | |
| JP | 2012-248527 A | 12/2012 | |
| JP | 2013097922 A | 5/2013 | |
| JP | 5475158 B1 | 4/2014 | |
| JP | 2014100010 A | 5/2014 | |
| JP | 2014-107976 A | 6/2014 | |
| JP | 2014-519137 A | 8/2014 | |
| JP | 2016-119168 A | 6/2016 | |
| JP | 2016-225112 A | 12/2016 | |
| WO | 9207366 A1 | 4/1992 | |
| WO | 03085793 A1 | 10/2003 | |
| WO | 2007/013589 A1 | 2/2007 | |
| WO | 2007052693 A1 | 5/2007 | |
| WO | 2007/088798 A1 | 8/2007 | |
| WO | 2008040626 A1 | 4/2008 | |
| WO | 2009/060639 A1 | 5/2009 | |
| WO | 2009/136460 A1 | 11/2009 | |
| WO | 2009139220 A1 | 11/2009 | |
| WO | 2012042979 A1 | 4/2012 | |
| WO | 2014/125666 A1 | 8/2014 | |
| WO | 2014/135615 A1 | 9/2014 | |
| WO | 2014168200 A1 | 10/2014 | |
| WO | 2019021850 A1 | 1/2019 | |
| WO | 2019/177016 A1 | 9/2019 | |
| WO | 2019/188062 A1 | 10/2019 | |
| WO | 2020/157867 A1 | 8/2020 | |
| WO | 2020/157868 A1 | 8/2020 | |
| WO | 2020/158445 A1 | 8/2020 | |
| WO | 2020/158862 A1 | 8/2020 | |

OTHER PUBLICATIONS

Mar. 10, 2022 Office Action issued in Indian Patent Application No. 202117036240.
Mar. 10, 2022 Office Action issued in Indian Patent Application No. 202117036742.
Mar. 17, 2022 Office Action issued in Indian Patent Application No. 202117036460.
Feb. 24, 2022 Office Action issued in Indian Patent Application No. 202117036512.
Sep. 20, 2022 Office Action issued in Japanese Patent Application No. 2020-569238.
Aug. 10, 2022 Office Action issued in Chinese Patent Application No. 202080011525.9.
Sep. 20, 2022 Office Action issued in Japanese Patent Application No. 2020-569239.
Jul. 20, 2022 Office Action issued in Chinese Patent Application No. 201980089342.6.
Feb. 26, 2019 Search Report issued in International Patent Application No. PCT/JP2019/003195.
Mar. 31, 2020 Search Report issued in International Patent Application No. PCT/JP2020/003430.
Apr. 23, 2019 International Search Report issued in International Patent Application No. PCT/JP2019/003196.
U.S. Appl. No. 17/427,375, filed Jul. 30, 2021 in the name of Araki et al.

(56) References Cited

OTHER PUBLICATIONS

U.S. Appl. No. 17/426,577, filed Jul. 28, 2021 in the name of Araki et al.
U.S. Appl. No. 17/426,581, filed Jul. 28, 2021 in the name of Araki et al.
Jun. 2, 2022 Office Action issued in Chinese Patent Application No. 202080011663.7.
Mar. 28, 2023 Office Action issued in Chinese Patent Application No. 201980089342.6.
Apr. 4, 2023 Office Action issued in Japanese Patent Application No. 2019-219009.
Jun. 16, 2023 Office Action issued in U.S. Appl. No. 17/426,581.
Efunda_reference; Silicone/polyester; https://www.efunda.com/materials/polymers/properties/polymer_datasheet.cfm?MajorID=TPE&MinorID=9 (Year: 2023).
Jun. 22, 2023 Office Action issued in U.S. Appl. No. 17/427,375.
Jun. 16, 2023 Office Action issued in U.S. Appl. No. 17/426,577.

* cited by examiner

INSULATED ELECTRIC WIRE AND WIRE HARNESS

TECHNICAL FIELD

The present invention relates to an insulated electric wire and a wire harness.

BACKGROUND ART

In some cases, water-stopping treatment is applied to a middle portion of an insulated electric wire in the longitudinal axis direction of the wire. In that time, in an exposed portion in which an insulation covering is removed and a conductor is exposed, gaps between elemental wires that constitute the conductor are filled with a water-stopping agent, and a water-stopping portion can be formed. An example of a structure of this water-stopping portion is shown in a cross-sectional view of an insulated electric wire 1' in FIG. 3. As disclosed also in Patent Documents 1 and 2, when a water-stopping portion 4' is formed with a water-stopping agent 5 over the entire area of an exposed portion 10', and the water-stopping agent 5 continuously covers covered portions 20' that are located on both sides of the exposed portion 10' and in which an insulation covering 3 covers the conductor 2, the water-stopping agent 5 can add a water-stopping performance of preventing movement of water inside the insulated electric wire 1', and a waterproofing performance of preventing entry of water into the insulated electric wire 1' from the outside. In this case, in an end portion of each of the covered portions 20', the water-stopping agent 5 is placed in gaps between the elemental wires constituting the conductor 2 and in an outer circumferential area of the insulation covering 3, as well as in an area between the insulation covering 3 and the conductor 2.

CITATION LIST

Patent Documents

Patent Document 1: Specification of German Patent Application Publication No. DE 10 2011 083 952
Patent Document 2: JP 2013-97922 A
Patent Document 3: JP 2000-11771 A
Patent Document 4: JP 2014-519137 A
Patent Document 5: JP S53-14169 U
Patent Document 6: JP 2007-226999 A
Patent Document 7: JP 2008-117616 A
Patent Document 8: JP 2016-225112 A
Patent Document 9: WO 2007/013589 A1
Patent Document 10: JP 2007-317480 A

SUMMARY OF INVENTION

Technical Problem

As disclosed in Patent Documents 1 and 2, when the water-stopping portion 4' is continuously formed over the entire area of an exposed portion 10' and an area including the covered portions 20' located on both sides of the exposed portion 10', it is possible to achieve a high degree of preventing water from entering the covered portion 20' from a boundary portion between the covered portion 20' and the exposed portion 10', and to realize a high waterproofing performance. Such a structure of the end portions of the covered portions 20' in which the gaps between the elemental wires constituting the conductor 2 and the areas between the insulation covering 3 and the conductor 2 are filled with the water-stopping agent 5 exhibits a superior water-stopping performance between the elemental wires of the conductor 2, as well as a high waterproofing performance with respect to the inner areas of the covered portions 20', and is particularly suitable for cases where prevention of entry of water into the covered portions 20' from the outside is highly required, for example. On the other hand, in a situation where water can enter the covered portion 20' due to some reasons, if the structure in which the gaps between the elemental wires constituting the conductor 2 and the area between the insulation covering 3 and the conductor 2 are filled with the water-stopping agent 5 is applied to the end portion of the covered portion 20', water that has once entered the covered portion 20' may be unlikely to escape from the covered portion 20'.

For example, there is a possible configuration in which the insulated electric wire 1' is provided with, at both ends thereof, electric connection members capable of connecting to another device. In such configuration, one electric connection member (located on the left side in FIG. 3, for example) may have a waterproof structure for preventing entry of water from the outside, while the other electric connection member (located on the right side in FIG. 3) may not have any waterproof structure and have a non-waterproof structure. In this case, if the water-stopping portion 4' is formed in a middle portion of the insulated electric wire 1' and the gaps between the elemental wires of the conductor 2 are filled with the water-stopping agent 5, even if water W adhering to the non-waterproof-side electric connection member enters the covered portion 20' and moves inside the non-waterproof-side covered portion 20' along the gaps between the elemental wires, the water W cannot move beyond the water-stopping portion 4' in which the gaps between the elemental wires are filled with the water-stopping agent 5. Accordingly, it is possible to prevent a situation where the water W moves to the electric connection member on the side on which the waterproof structure is provided, and further to a device to which this electric connection member is connected, and affects them.

However, in the configuration of FIG. 3, the water-stopping portion 4' is formed over the area including portions of the covered portions 20' on both the non-waterproof side and the waterproof side. Further, in the end portions of the covered portions 20', the gaps between the elemental wires constituting the conductor 2 and the areas between the insulation covering 3 and the conductor 2 are filled with the water-stopping agent 5. Thus, water W that has entered the non-waterproof side (right-side) covered portion 20' via the non-waterproof side electric connection member is prevented from moving by the water-stopping agent 5 that seals the entire end portion of this covered portion 20', and cannot escape from the boundary portion between the covered portion 20' and the exposed portion 10'. As an escape path of the water W, there is only a path through the non-waterproof side electric connection member that is reversed with respect to a path through which the water W entered the covered portion 20', and thus the water W that has once entered the covered portion 20' is unlikely to be removed from the area surrounded by the insulation covering 3 and the water-stopping agent 5. Accordingly, the water W may stay inside the covered portion 20' over a long period of time. Such a structure where the water-stopping portion 4' is continuously formed over an area including the covered portions 20' located on both sides of the exposed portion 10' to improve the waterproofing performance realizes an advantageous effect in terms of preventing entry of water from boundary positions between the exposed portion 10' and the covered portions 20', but it may be even more difficult to apply this structure to cases where water may enter the covered portion 20' from another position such as, for example, the non-waterproof electric connection member.

Therefore, an object is to provide an insulated electric wire that has an excellent water-stopping performance and has a configuration in which, even if water enters the insulated electric wire, the water is unlikely to stay inside the insulated electric wire, and a wire harness including such an insulated electric wire.

Solution to Problem

An insulated electric wire according to the present disclosure contains: a conductor in which a plurality of elemental wires made of a metal material are twisted together; and an insulation covering that covers an outer circumference of the conductor; wherein the insulated electric wire contains: an exposed portion in which the insulation covering is removed from the outer surface of the conductor; and a first covered portion and a second covered portion in which the insulation covering covers the outer circumference of the conductor, the first covered portion, the exposed portion, and the second covered portion being adjacent to each other in a longitudinal axis direction of the insulated electric wire in this order, a water-stopping portion being further provided in at least an area extending from a part of the exposed portion to a part of the first covered portion, gaps between the elemental wires in the water-stopping portion being filled with a water-stopping agent, and a region of the second covered portion that is adjacent to the exposed portion being a non-waterproof end that has a void between the elemental wires and/or between the conductor and the insulation covering.

A wire harness according to the present disclosure contains the above-described insulated electric wire, and electric connection members provided at both ends of the insulated electric wire, the electric connection members being capable of connecting to another device.

Advantageous Effects of Invention

The insulated electric wire according to the present disclosure has an excellent water-stopping performance and has a configuration in which, even if water enters the insulated electric wire, the water is unlikely to stay inside the insulated electric wire. Also, the wire harness according to the present disclosure relates to a wire harness that includes such an insulated electric wire.

DESCRIPTION OF EMBODIMENTS

Figure 1:
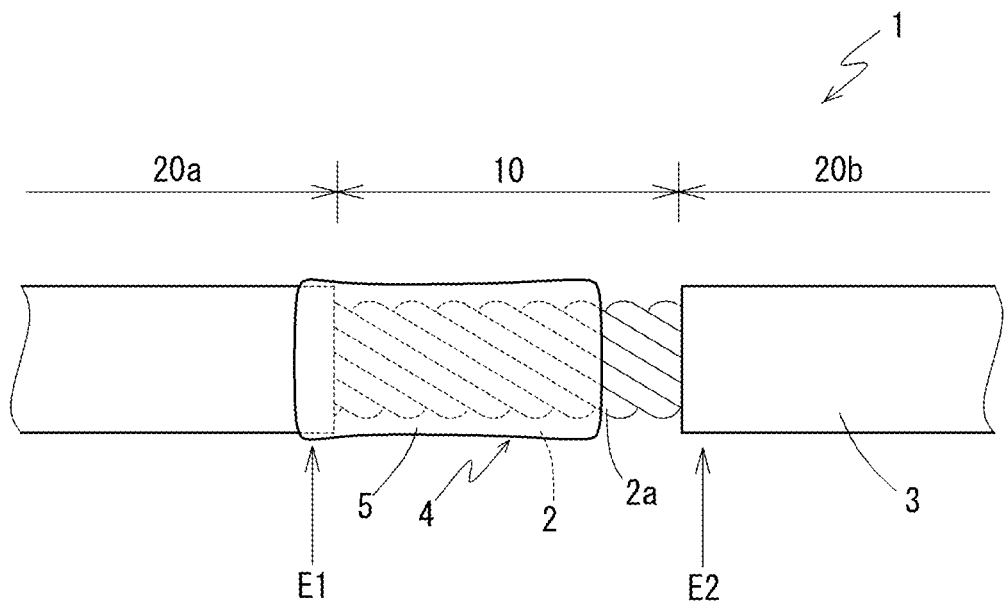
FIG. 1 is a side view illustrating an insulated electric wire according to an embodiment of the present disclosure.

Description of Embodiments of the Present Disclosure

First, embodiments of the present disclosure will be listed and described.

An insulated electric wire according to the present disclosure contains: a conductor in which a plurality of elemental wires made of a metal material are twisted together; and an insulation covering that covers an outer circumference of the conductor; wherein the insulated electric wire contains: an exposed portion in which the insulation covering is removed from the outer surface of the conductor; and a first covered portion and a second covered portion in which the insulation covering covers the outer circumference of the conductor, the first covered portion, the exposed portion, and the second covered portion being adjacent to each other in a longitudinal axis direction of the insulated electric wire in this order, a water-stopping portion being further provided in at least an area extending from a part of the exposed portion to a part of the first covered portion, gaps between the elemental wires in the water-stopping portion being filled with a water-stopping agent, and a region of the second covered portion that is adjacent to the exposed portion being a non-waterproof end that has a void between the elemental wires and/or between the conductor and the insulation covering.

In the insulated electric wire, since, in an exposed portion, the gaps between the elemental wires constituting the conductor are filled with a water-stopping agent, it is possible to effectively prevent water from entering the gaps between the elemental wires, and the water from moving along the gaps between the elemental wires, and realize a superior water-stopping performance. Also, in the covered portions provided on both sides of the exposed portion, a region of the second covered portion that is adjacent to the exposed portion is a non-waterproof end that has a void between the elemental wires and/or between the conductor and the insulation covering. Accordingly, even if water enters the second covered portion due to some reasons, the water can flow or vaporize from the void provided in the non-waterproof end, and can escape from the inside of the second covered portion to the outside. As a result, the water that has entered the second covered portion is unlikely to stay inside the second covered portion over a long period of time, and it is possible to protect the insulated electric wire from long term contact with the water.

Thus, by filling the gaps between the elemental wires in the water-stopping portion with the water-stopping agent, and defining an end of the second covered portion, of the two covered portions adjacent to the exposed portion, as the non-waterproof end, it is possible to facilitate, even if water enters the second covered portion, drainage of the water on the second covered portion side while preventing the water from moving to the first covered portion along the gaps between the elemental wires. Therefore, it is possible to appropriately use the insulated electric wire in a state in which, for example, the insulated electric wire is connected to a non-waterproof device on the second covered portion side, and is connected to a waterproof device on the first covered portion side.

Here, preferably, the second covered portion has the void between the conductor and the insulation covering. This arrangement is particularly effective in facilitating the drainage of water that has entered the insulated electric wire on the second covered portion side.

Preferably, a region of the first covered portion that is adjacent to the exposed portion is a waterproof end in which a gap between the conductor and the insulation covering is filled with the water-stopping agent. With this arrangement, water is prevented from entering the first covered portion from a boundary portion with the exposed portion, and a particularly high waterproofing performance can be realized on the first covered portion side.

In this case, preferably, an outer circumference of the insulation covering at the waterproof end is covered by the water-stopping agent, continuously from the gap between the insulation covering and the conductor filled with the water-stopping agent, an outer circumference of the insulation covering at the non-waterproof end is not covered by the water-stopping agent, and the exposed portion includes, at a position adjacent to the non-waterproof end, a zone in which the water-stopping agent is not placed on the outer circumference of the conductor. Accordingly, at the first covered portion including the waterproof end, the outer circumference of the insulation covering is covered by the water-stopping agent, making it possible to effectively prevent entry of water into the first covered portion from the outside of the insulation covering. On the other hand, at the second covered portion including the non-waterproof end, the outer circumference of the insulation covering is not covered by the water-stopping agent, and the exposed portion also includes, at a position adjacent to the second covered portion, a zone in which the outer circumference of the conductor is not covered by the water-stopping agent, making it easy to reliably form a void that is not filled with the water-stopping agent between the insulation covering and the conductor.

Preferably, in the second covered portion, an outer diameter of the conductor is smaller in an area of the non-waterproof end adjacent to the exposed portion than in a remote area that is distanced from the exposed portion. With this arrangement, at the non-waterproof end of the second covered portion, the distance can be secured between the conductor whose diameter is small, and the insulation covering, and a sufficiently large void is easily formed.

Preferably, the outer diameter of the conductor is smaller in the exposed portion than in the remote area. With this arrangement, the distances between the elemental wires are narrowed in the exposed portion and the water-stopping agent in the gaps between the elemental wires can be easily held. Also, at the ends of the covered portions continuously extending from the exposed portion, the outer diameter of the conductor is easily reduced, and as a result, a sufficiently large void can be more easily formed between the conductor and the covered portion in the non-waterproof portion provided at the end of the second covered portion. When the water-stopping portion is formed in the insulated electric wire, by filling the gaps between the elemental wires with the water-stopping agent, and then twisting the conductor to tighten the twist, it is possible to simply realize a state in which the diameter of the conductor is smaller in the exposed portion and the end portions of the two covered portions than in the remote areas.

A wire harness according to the present disclosure contains the above-described insulated electric wire, and electric connection members provided at both ends of the insulated electric wire, the electric connection members being capable of connecting to another device.

In this wire harness, the water-stopping portion is formed in a middle portion of the insulated electric wire provided with electric connection members on both sides. Also, an end portion of the second covered portion, which is located on one of both sides of the exposed portion including the water-stopping portion, is the non-waterproof end. Accordingly, even if water enters the second covered portion via an electric connection member or the like, the water is prevented from moving toward the first covered portion by the presence of the water-stopping portion, and thus a wire harness having a superior water-stopping performance is realized. On the other hand, water that has entered the second covered portion can escape from the void provided at the non-waterproof end, and is unlikely to stay inside the wire harness over a long period of time. As a result, it is possible to effectively protect a device connected to the wire harness on the first covered portion side from adverse effects of water, and also protect the wire harness itself or the connected device on the second covered portion side from adverse effects of water due to long term contact with water.

Preferably, the electric connection member provided on the first covered portion side contains a waterproof structure for preventing entry of water from the outside, and the electric connection member provided on the second covered portion side does not contain any waterproof structure. With this arrangement, even if water enters the electric connection member without any waterproof structure provided on the second covered portion side, the water can be effectively prevented from moving from the second covered portion toward the first covered portion along the conductor constituting the insulated electric wire, and entering the electric connection member with the waterproof structure provided on the first covered portion side, and the device connected to the electric connection member. Accordingly, it is possible to improve the effectiveness of the waterproof characteristic with the waterproof structure formed in the electric connection member provided on the first covered portion side, and effectively protect the device to which the electric connection member is connected from the entry of water. On the other hand, water that has entered the electric connection member without any waterproof structure provided on the second covered portion can escape to the outside of the insulated electric wire via the void provided at the non-waterproof end at a boundary between the second covered portion and the exposed portion. Therefore, on the second covered portion side, it is possible to prevent the insulated electric wire itself, the electric connection member, and the connected device from being subjected to adverse effects such as corrosion due to long term contact with water.

Details of Embodiments of Present Disclosure

Hereinafter, an insulated electric wire and a wire harness according to an embodiment of the present disclosure will be described in detail with reference to the drawings. In the present specification, "water-stopping" means avoiding or preventing movement of water from one position to another position inside an insulated electric wire in the longitudinal axis direction. Meanwhile, "waterproofing" means avoiding or preventing entry of water into an insulated electric wire from the outside. Also, in the present specification, the expression "water" may include liquids other than water such as electrolytes.

Insulated Electric Wire
(1) Overall Structure

Figure 2:
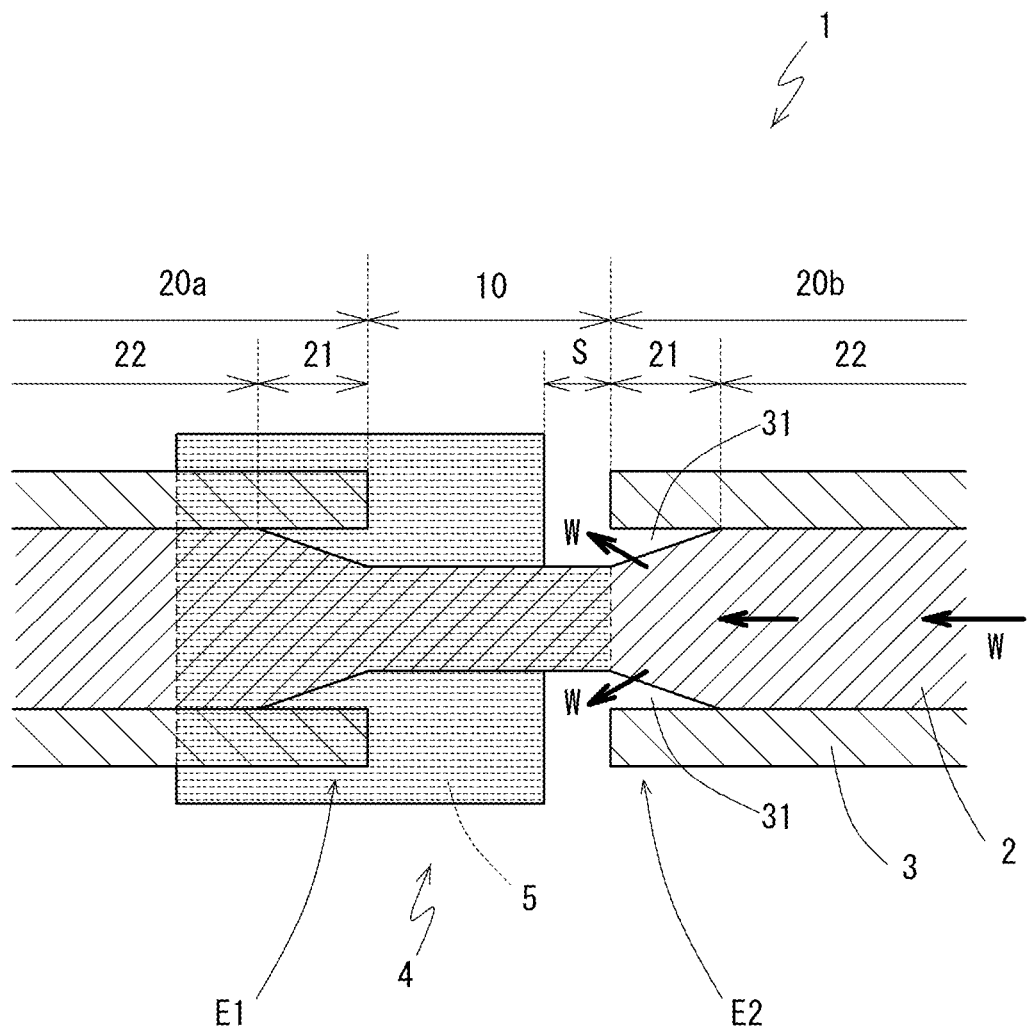
FIG. 2 is a schematic cross-sectional view illustrating the insulated electric wire in which an exposed portion has a waterproof end on one end side, and has a non-waterproof end on the other end side.

FIGS. 1 and 2 show an overview of an insulated electric wire 1 according to an embodiment of the present disclosure. The insulated electric wire 1 contains a conductor 2 in which a plurality of elemental wires 2*a* made of a metal material are twisted together, and an insulation covering 3 that covers the outer circumference of the conductor 2. A water-stopping portion 4 is formed in a middle portion of the insulated electric wire 1 in the longitudinal axis direction thereof. FIG. 2 is a schematic cross-sectional view illustrating the insulated electric wire 1 with the elemental wires 2*a* omitted.

The elemental wires 2*a* constituting the conductor 2 may be made of any kind of conductive material, and copper is typically used as the material of the conductor of the insulated electric wire. Instead of copper, metal materials such as aluminum, magnesium, and iron may also be used. The metal material may be an alloy. Examples of other metal materials that can be used to form an alloy include iron, nickel, magnesium, silicon, and combinations of these metal materials. All of the elemental wires 2*a* may be made of the same metal material, or elemental wires 2*a* made of multiple metal materials may be mixed in combination.

There is no particular limitation to the twist structure of the elemental wires 2*a* of the conductor 2, but a simple twist structure is preferable in view of, for example, securing gaps between the elemental wires 2*a* and easily filling the gaps with the water-stopping agent 5 when the water-stopping portion 4 is formed. For example, a twist structure in which the elemental wires 2*a* are collectively twisted all together is preferred rather than a master-slave twist structure in which a plurality of strands each containing a plurality of twisted elemental wires 2*a* are gathered and further twisted. Also, there is no particular limitation to the diameter of the whole conductor 2 and the diameter of each elemental wire 2*a*. However, the effect and significance of filling minute gaps between the elemental wires 2*a* in the water-stopping portion 4 with the water-stopping agent 5 to improve reliability of the water-stopping characteristic is greater as the diameters of the whole conductor 2 and each elemental wire 2*a* are smaller, and thus it is preferable that the cross section of the conductor be about 8 mm$^2$ or smaller and the diameter of individual elemental wires be about 0.45 mm or smaller.

There is no particular limitation to the material constituting the insulation covering 3 as long as it is an insulating polymer material. Examples of such materials include a polyvinyl chloride (PVC) resin and an olefin-based resin. In addition to the polymer material, a filler or an additive may be contained as appropriate. Further, the polymer material may be cross-linked.

An area in which the water-stopping portion 4 is formed includes an exposed portion 10 in which the insulation covering 3 is removed from the outer circumference of the conductor 2. Covered portions 20*a* and 20*b* in which the insulation covering 3 covers the outer circumference of the conductor 2 are provided on both sides of the exposed portion 10 in the longitudinal direction of the insulated electric wire 1. The two covered portions 20*a* and 20*b* have the same configuration except for the structures of portions (E1, E2) adjacent to the exposed portion, and hereinafter, one of the covered portions is referred to as "waterproof-side covered portion (first covered portion) 20*a*", and the other covered portion is referred to as "non-waterproof-side covered portion (second covered portion) 20*b*". The waterproof-side covered portion 20*a*, the exposed portion 10, and the non-waterproof-side covered portion 20*b* are formed adjacent to each other in the longitudinal axis direction of the insulated electric wire 1, in this order.

Figure 3:
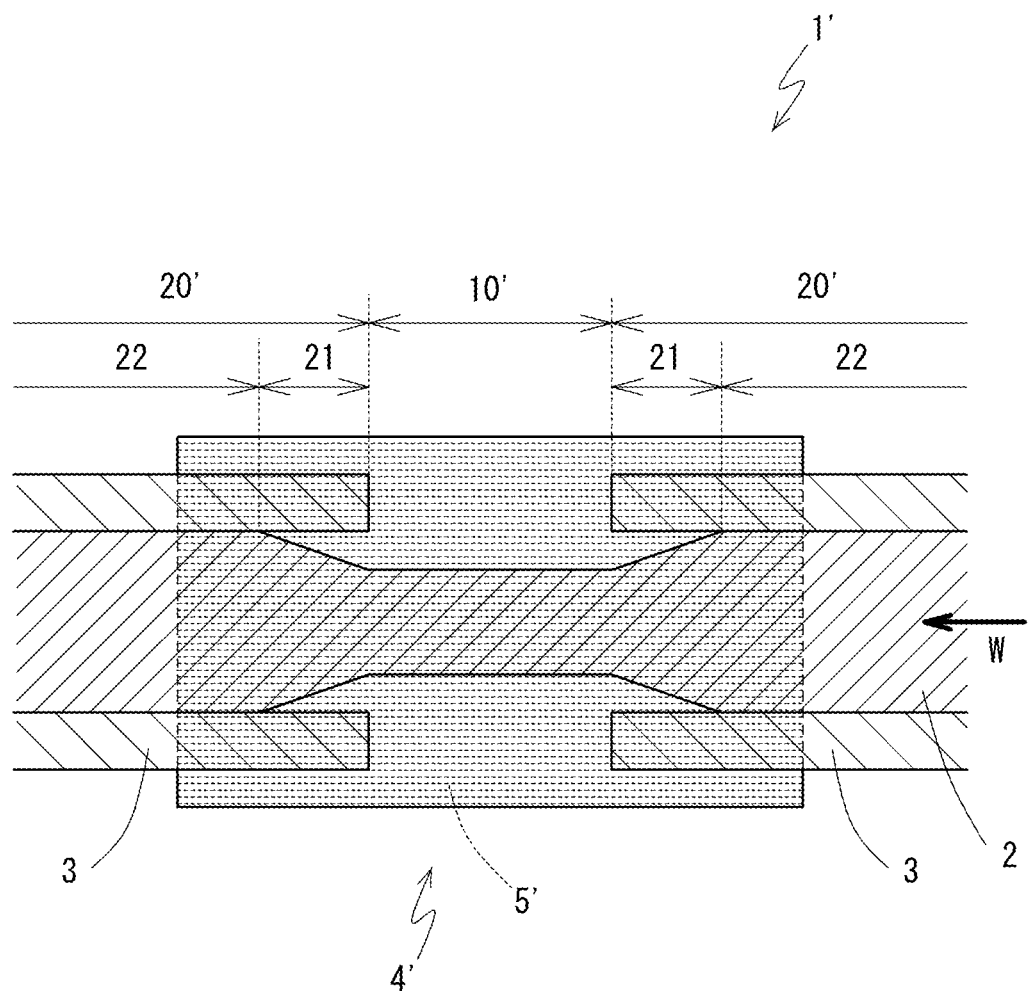
FIG. 3 is a schematic cross-sectional view illustrating an insulated electric wire in which an exposed portion has waterproof ends on both end sides.

The water-stopping portion 4 is constituted by an area that includes at least a part of the exposed portion 10 and a part of the waterproof-side covered portion 20*a*, and in the water-stopping portion 4, the gaps between the elemental wires 2*a* constituting the conductor 2 are filled with the water-stopping agent 5. Furthermore, preferably, the water-stopping agent 5 also covers the outer circumference of the conductor 2 in the exposed portion 10, continuously from the filled area between the elemental wires 2*a* in the exposed portion 10. In FIG. 2 and above-referenced FIG. 3, the filled area in which the water-stopping agent 5 is placed is shown with a dot pattern.

A partial area of the waterproof-side covered portion 20*a* that includes an end portion adjacent to the exposed portion 10 is defined as a waterproof end E1 having waterproof characteristics. On the other hand, an area of the non-waterproof-side covered portion 20*b* that includes an end portion adjacent to the exposed portion 10 is defined as a non-waterproof end E2 having no waterproof characteristics. Although the structures of the waterproof end E1 and the non-waterproof end E2 will be described in detail later, the water-stopping portion 4 is constituted by a continuous area in the longitudinal direction of the insulated electric wire 1 that is located between the waterproof end E1 of the waterproof-side covered portion 20*a* and the non-waterproof end E2 of the non-waterproof-side covered portion 20*b*, and is formed as one piece with this area. The waterproof end E1, which is provided as an area including the end portion of the waterproof-side covered portion 20*a*, has a configuration in which the gaps between the elemental wires 2*a* are filled with the water-stopping agent 5, whereas the non-waterproof end E2, which is provided as an area including the end of the non-waterproof-side covered portion 20*b*, has a configuration in which a void 31 that is not filled with the water-stopping agent 5 is left between the elemental wires 2*a* and/or a position between the conductor 2 and the insulation covering 3.

In the embodiment shown in FIG. 2, at the waterproof end E1, the water-stopping agent 5 is placed in the outer circumferential area of the waterproof-side covered portion 20*a*, and in every portion of the internal space enclosed by the insulation covering 3, that is, in the areas between the elemental wires 2*a* and the area between the conductor 2 and the insulation covering 3. On the other hand, at the non-waterproof end E2, the gaps between the elemental wires 2*a* are filled with the water-stopping agent 5, but the void 31, which is not filled with the water-stopping agent 5, is left between the conductor 2 and the insulation covering 3. As will be described in detail later on a wire harness 6, in the insulated electric wire 1 according to the present embodiment, preferably, a structure that requires waterproofing such as a connection member or device that has a waterproof structure is arranged on or connected to the waterproof-side covered portion 20*a* including the waterproof end E1, whereas a non-waterproof structure for which contact with water is envisioned such as a connection member or device that does not have any waterproof structure is arranged on or connected to the non-waterproof-side covered portion 20*b* including the non-waterproof end E2.

The conductor diameter (outer diameter of the entire conductor 2) is preferably smaller in the exposed portion 10 than in remote areas 22 of the covered portions 20*a* and 20*b* located on both sides of the exposed portion 10, the remote areas 22 distanced from adjacent areas 21 adjacent to the exposed portion 10. Furthermore, preferably, the twist pitch of the elemental wires $2a$ is smaller in the exposed portion 10 than in the remote areas 22 of the covered portions $20a$ and $20b$, and the distances between the elemental wires $2a$ is smaller in the exposed portion 10 than in the remote areas 22. In these cases, in the exposed portion 10, the water-stopping agent 5 is easily held in the gaps between the elemental wires $2a$ while densely filling up the gaps. Also, as will be described later, a sufficiently large void 31 is likely to be formed at the non-waterproof end E2 located adjacent to the exposed portion 10. Furthermore, preferably, the density (density of a conductive material per unit length) of the conductor 2 is higher in the exposed portion 10 than in the remote areas 22 of the covered portions $20a$ and $20b$. If so, sufficient spaces between the elemental wires $2a$ are secured in the exposed portion 10, and the spaces are easily filled with the water-stopping agent 5 with high uniformity.

There is no particular limitation to the material constituting the water-stopping agent 5 as long as it is a resin composition through which a fluid such as water is unlikely to pass and that can exhibit a water-stopping performance. However, the water-stopping agent 5 is preferably made of a thermoplastic resin composition or a curable resin composition due to the reason that the gaps between the elemental wires $2a$ are easily and uniformly filled with the water-stopping agent 5 in a high flowability state, and the like. By placing such a resin composition in a high flowability state between the elemental wires $2a$ and on the outer circumferences (outer circumferential areas) of the exposed portion 10 and the end portion of the waterproof-side covered portion $20a$, and then bringing the resin composition to a low flowability state, it is possible to reliably form a water-stopping portion 4 having an excellent water-stopping performance and an excellent waterproofing performance. Among the materials, a curable resin is preferably used as the water-stopping agent 5. A curable resin is preferably a resin having one or more of types of curability such as heat curability, light curability, moisture curability, two-component curability, and anaerobic curability. Specifically, the resin composition constituting the water-stopping agent 5 preferably has light curability, specifically ultraviolet curability, in view of curing the water-stopping agent 5 placed in gaps between the elemental wires $2a$ and in the outer circumferential areas of the exposed portion 10 and the end portion of the waterproof-side covered portion $20a$ in a short time, and forming the water-stopping portion 4 with a highly uniform distribution of the water-stopping agent 5. Furthermore, the resin composition constituting the water-stopping agent 5 preferably has anaerobic curability, that is, the property of being cured upon contact with a metal in a state in which molecular oxygen is blocked, in view of curing the water-stopping agent 5 with adhering to the surface of the elemental wires $2a$.

There is no particular limitation to the specific type of the resin constituting the water-stopping agent 5. Examples of the resin include silicone resins, acrylic resins, epoxy resins, and urethane resins. To the resin material, various kinds of additives can be appropriately added as long as the characteristics of the resin material as the water-stopping agent 5 are not deteriorated. Also, it is preferable to use only one type of water-stopping agent 5 in view of simplicity of the configuration, but two or more types of water-stopping agents 5 may also be combined or stacked, for example, as appropriate. The water-stopping agent 5 is preferably made of an insulating material in view of insulating the conductor 2 from the outside.

It is preferable that the water-stopping agent 5 be a resin composition having a viscosity of 4 Pa·s or higher, more preferably 5 Pa·s or higher, still more preferably 10 Pa·s or higher at the time of filling. This is because, when the water-stopping agent 5 is placed at the areas between the elemental wires $2a$ and on the outer circumferential areas, especially on the outer circumferential areas, the water-stopping agent 5 hardly drops or flows and is likely to stay at the areas with high uniformity. Another reason is that it is easy to reliably keep the void 31 unfilled with the water-stopping agent 5 at the non-waterproof end E2. On the other hand, it is preferable that the viscosity of the water-stopping agent 5 at the time of filling be kept at 200 Pa·s or lower. This is because, when the viscosity is not too high, the water-stopping agent 5 is likely to permeate into the areas between the elemental wires $2a$ sufficiently.

As described above, when the gaps between the elemental wires $2a$ in the exposed portion 10 are filled with the water-stopping agent 5, water stopping is realized at the areas between the elemental wires $2a$, and a fluid such as water is prevented from entering the areas between the elemental wires $2a$ from the outside. Also, even if water enters a gap between the elemental wires $2a$ through a portion of the insulated electric wire 1, the water is prevented from moving to another portion of the insulated electric wire 1 along the elemental wires $2a$. For example, it is possible to prevent water adhering to the terminal portion of the non-waterproof-side covered portion $20b$, out of the terminals (end portions of the entire insulated electric wire) on both sides of the insulated electric wire 1, from moving toward the waterproof-side covered portion $20a$ beyond the water-stopping portion 4 through a gap between the elemental wires $2a$.

If the water-stopping agent 5 covers the outer circumferential portion of the conductor 2 in the exposed portion 10, the water-stopping portion 4 also plays a role of physically protecting the exposed portion 10. In addition, if the water-stopping agent 5 is made of an insulating material, the water-stopping agent 5 also plays a role of insulating the conductor 2 in the exposed portion 10 from the outside.

The water-stopping portion 4 covered with the water-stopping agent 5 may include, in addition to the conductor 2 and the insulation covering 3, another member such as a connection member. Examples of the case where the water-stopping portion 4 includes another member include a case where the water-stopping portion 4 includes a splice portion in which a plurality of insulated electric wires 1 are joined to each other. Also, a protection member such as a tube or a tape made of a resin material may also be provided on the outer circumference of the water-stopping portion 4. By providing the protection member, it is possible to protect the water-stopping portion 4 from a physical stimulus such as contact with an external object. Also, if the water-stopping agent 5 is made of a curable resin for example, the water-stopping agent 5 is subjected to aging, and may be damaged when the water-stopping portion 4 is bent or vibrated. However, if a protection member is provided on the outer circumference of the water-stopping portion 4, such damages can be reduced. In view of effectively reducing the influence of bending or vibration on the water-stopping portion 4, the protection member is preferably made of a material that has higher rigidity than that of the water-stopping agent 5 constituting the water-stopping portion 4. The protection member can be arranged, for example, by winding a tape material having an adhesive layer around the outer circumference of the insulated electric wire 1 including the water-stopping portion 4 in a spiral shape. However, when a protection member is arranged, the protection member needs to be arranged so as not to liquid-tightly cover the void 31 provided at the non-waterproof end E2.

(2) Structure of Waterproof End

As described above, of the covered portions 20a and 20b provided on both sides of the exposed portion 10, the waterproof-side covered portion 20a has the waterproof end E1 in a boundary portion with the exposed portion 10. At the waterproof end E1, the water-stopping portion 4 extends to a part of the end portion of the covered portion 20a. That is to say, at the waterproof end E1, the gaps between the elemental wires 2a inside an area covered by the insulation covering 3 are filled with the water-stopping agent 5. Furthermore, it is preferable that the gap between the insulation covering 3 and the conductor 2 be also filled with the water-stopping agent 5, continuously from those gaps between the elemental wires 2a. It is further preferable that the water-stopping agent 5 be placed covering the outer circumference of the insulation covering 3, continuously from those gaps between the elemental wires 2a and the gap between the insulation covering 3 and the conductor 2.

Since the gaps between the elemental wires 2a at the waterproof end E1 are sealed by the water-stopping agent 5 continuously from the gaps between the elemental wires 2a in the exposed portion 10, even if water enters a gap between the elemental wires 2a in the non-waterproof-side covered portion 20b located opposite across the water-stopping portion 4, the water is unlikely to enter the waterproof-side covered portion 20a along the elemental wires 2a. Accordingly, the waterproof-side covered portion 20a can have a superior water-stopping performance.

The water-stopping performance at the waterproof end E1 is further improved if, in addition to the areas between the elemental wires 2a, the area between the insulation covering 3 and the conductor 2 is also sealed by the water-stopping agent 5. Furthermore, in this case, even if water comes into contact with the waterproof end E1 or the vicinity thereof from the outside, the water cannot enter the gap between the insulation covering 3 and the conductor 2 in the waterproof-side covered portion 20a. Accordingly, the waterproof-side covered portion 20a can have a high waterproofing performance. Furthermore, if the water-stopping agent 5 is placed on an area of the waterproof end E1 that covers the outer circumference of the insulation covering 3, entry of water into the waterproof-side covered portion 20a is prevented better, making it possible to improve the waterproofing performance.

As described above, in view of efficiency in holding the water-stopping agent 5 in the gaps between the elemental wires 2a, and the like, it is preferable that the conductor diameter be smaller in the exposed portion 10 than in the remote areas 22 of the covered portions 20a and 20b. In this case, the conductor diameter in the waterproof-side covered portion 20a is also likely to be smaller in the adjacent area 21 adjacent to the exposed portion 10 than in the remote area 22. Thus, the distance between the insulation covering 3 and the conductor 2 is larger in the adjacent area 21 than in the remote area 22, and a gap is likely to be generated in the adjacent area 21. However, such a gap at the end of the waterproof-side covered portion 20a is preferably filled with the water-stopping agent 5.

(3) Structure of Non-Waterproof End

Of the waterproof-side covered portion 20a and the non-waterproof-side covered portion 20b with the exposed portion 10 interposed therebetween, one end side of the waterproof-side covered portion 20a is defined as the waterproof end E1 as described above, and one end side of the non-waterproof-side covered portion 20b is defined as the non-waterproof end E2. At the non-waterproof end E2, at least one of an area between the elemental wires 2a, and an area between the insulation covering 3 and the conductor 2 is not filled with the water-stopping agent 5, and a void 31 is formed as a space not filled with the water-stopping agent 5. The void 31 is communicated with an outside space of the water-stopping portion 4 (outside space of the area sealed or surrounded by the water-stopping agent 5 or the insulation covering 3) and a space between the elemental wires 2a that is formed in an area of the non-waterproof-side covered portion 20b other than the non-waterproof end E2, and is not filled with the water-stopping agent 5, and liquid and gas can flow between these spaces.

In the non-waterproof-side covered portion 20b, there is no limitation to the position at which the void 31 is formed, as long as a void 31 is reliably formed in at least one of an area between the elemental wires 2a, and an area between the insulation covering 3 and the conductor 2 at the end serving as the non-waterproof end E2. In the embodiment shown in FIG. 2, the water-stopping agent 5 fills up the gaps between the elemental wires 2a in a way to reach the boundary between the exposed portion 10 and the non-waterproof-side covered portion 20b, and thus a void 31 is unlikely to be formed there. However, a void 31 is securely formed between the insulation covering 3 and the conductor 2. By providing the void 31 between the insulation covering 3 and the conductor 2, it is easy to form a large void 31, and thus realize communicability with the outside space. However, in view of easily securing the communicability between the void 31 and the spaces between the elemental wires 2a in the area of the non-waterproof-side covered portion 20b other than the non-waterproof end E2, it is preferable that a void 31, which is not filled with the water-stopping agent 5, be also left in an area between the elemental wires 2a at the non-waterproof end E2.

As described above, in the water-stopping portion 4 of the insulated electric wire 1 according to the present embodiment, there is no limitation as to how the water-stopping agent 5 is placed in the water-stopping portion 4 as long as the gaps between the elemental wires 2a are filled with the water-stopping agent over at least an area including a part of the exposed portion 10 and a part of the waterproof-side covered portion 20a, and further a void 31, which is not filled with the water-stopping agent 5, is left at the waterproof end E2 in at least one of an area between the elemental wires 2a, and an area between the insulation covering 3 and the conductor 2. In the embodiment shown in FIG. 2, in the non-waterproof-side covered portion 20b including the waterproof end E2, the water-stopping agent 5 is not placed in the outer circumferential area of the insulation covering 3. In a case where the water-stopping agent 5 is also placed in the outer circumferential area of the covered portion 20b, even if a void 31 is formed between the insulation covering 3 and the conductor 2, the opening of the void 31 will be covered and closed by the layer of the water-stopping agent 5 in the outer circumferential area, and the communicability with the outside space is very likely not to be secured. Therefore, it is preferable that the water-stopping agent 5 be not placed in the outer circumferential area of the non-waterproof-side covered portion 20b including the waterproof end E2. Furthermore, due to the same reason, it is preferable that the portion of the exposed portion 10 that is adjacent to the non-waterproof end E2 include a non-waterproof conductor zone S in which the water-stopping agent 5 is not placed in the outer circumferential area of the conductor 2. If the water-stopping agent 5 is also not placed in the areas between the elemental wires 2a in the non-waterproof conductor zone S, that is, if the water-stopping agent 5 is not placed in the non-waterproof conductor zone S regardless of the position, a sufficiently large void 31 is easily left between the elemental wires 2a at the non-waterproof end E2, in addition to between the insulation covering 3 and the conductor 2.

In the insulated electric wire 1 according to the present embodiment, since the non-waterproof-side covered portion 20b is formed as the non-waterproof end E2 in which a void 31, which is not filled with the water-stopping agent 5, is left, even if water W enters, due to some reasons, the non-waterproof-side covered portion 20b, that is, the area between the insulation covering 3 and the conductor 2 or the area between the elemental wires 2a in the non-waterproof-side covered portion 20b from a terminal of the insulated electric wire 1 as a whole, or the like, the water W can move in the inner space of the insulation covering 3, and reach the non-waterproof end E2, and further escape to the outside space of the insulated electric wire 1 through the void 31, as indicated by the arrows in FIG. 2. As examples of how the water W can escape from the void 31, the water W can flow out in a liquid state, or vaporize in a gaseous state. Thus, since a path through which water W can escape via the void 31 is secured, even if water W enters the non-waterproof-side covered portion 20b, the water W is unlikely to stay inside the non-waterproof-side covered portion 20b for a long period of time.

As a result, the constituent material of the insulated electric wire 1 is unlikely to be affected by long term contact with water, such as corrosion of the conductor 2. Furthermore, an electric connection member such as a terminal device provided at a terminal of the insulated electric wire 1 on the non-waterproof-side covered portion 20b side, and a device (see FIG. 6) to which this electric connection member is connected are also unlikely to be affected by long term contact with water. In Patent Document 10, a drainage hole for discharging water from a water-stopping structure is formed in the water-stopping portion, but in the insulated electric wire 1 according to the present embodiment, drainage can be realized with, instead of utilizing a water-stopping member having such a specific structure, a simple structure in which a void 31, which is not filled with the water-stopping agent 5, is left between the insulation covering 3 and the conductor 2 in the non-waterproof-side covered portion 20b or between the elemental wires 2a in the non-waterproof-side covered portion 20b.

In the non-waterproof-side covered portion 20b, it is preferable that the conductor diameter be smaller in the adjacent area 21 adjacent to the exposed portion 10 than in the remote area 22 distanced away from the adjacent area 21, and the area in which this adjacent area 21 is formed be defined as the non-waterproof end E2. If so, the distance between the insulation covering 3 and the conductor 2 at the non-waterproof end E2 is enlarged, and it is easy to secure a sufficiently large void 31 between the insulation covering 3 and the conductor 2. As described above, in view of efficiency in holding the water-stopping agent 5 in the gaps between the elemental wires 2a, and the like, it is preferable that the conductor diameter be smaller in the exposed portion 10 than in the remote areas 22, and in this case, the conductor diameter in the covered portion 20b is also likely to be smaller in the adjacent area 21 than in the remote area 22, due to the continuity of the conductor 2. That is to say, it is possible to improve the efficiency in holding the water-stopping agent 5 in the exposed portion 10, and secure a sufficiently large void 31 at the non-waterproof end E2, at the same time. Such a structure in which the conductor diameter is small throughout in the exposed portion 10 and the adjacent area 21 of the covered portion 20b can be simply formed by executing a later-described process in which gaps between the elemental wires 2a are filled with the water-stopping agent 5 in a state in which the distances between the elemental wires 2a in the exposed portion 10 are increased, and then the twist of the conductor 2 is tightened to reduce the twist pitch of the elemental wires 2a (retightening).

As described above, in the insulated electric wire 1 according to the present embodiment, the exposed portion 10 is formed in a middle portion in the longitudinal axis direction thereof, and the water-stopping portion 4 in which the gaps between the elemental wires 2a are filled with the water-stopping agent 5 is formed in the exposed portion 10, making it possible to realize a superior water-stopping performance. Specifically, it is possible to effectively prevent water from moving through the gaps between the elemental wires 2a from the non-waterproof-side covered portion 20b toward the waterproof-side covered portion 20a via the water-stopping portion 4. As a result, as in the later-described wire harness 6, it is possible to protect the electric connection member provided at the wire terminal on the waterproof-side covered portion 20a, and a device to which this electric connection member is connected from the adverse effect of water. At the same time, since the void 31 is formed at the non-waterproof end E2, even if water W enters the non-waterproof-side covered portion 20b from the wire terminal or the like of the non-waterproof-side covered portion 20b, the water W can be discharged from the void 31. By keeping the water W from staying inside the insulated electric wire 1 for a long period of time, it is possible to protect, in the area in which the non-waterproof-side covered portion 20b is provided, the insulated electric wire 1 itself, the electric connection member, and the device to which the electric connection member is connected, from long term contact with water. Also, since the water-stopping agent 5 is not placed in a portion, serving as a void 31, of the non-waterproof end E2, it is possible to suppress the amount the water-stopping agent 5 used. If the non-waterproof conductor zone S, in which no water-stopping agent 5 is placed, is provided at an end of the exposed portion 10, it is possible to further reduce the amount of the water-stopping agent 5 used.

(4) State of Cross Section of Water-Stopping Portion in Exposed Portion

As described above, the water-stopping portion 4 of the insulated electric wire 1 according to the present embodiment exhibits a water-stopping performance since an area including the gaps between the elemental wires 2a constituting the conductor 2 in the exposed portion 10 is filled with the water-stopping agent 5. The water-stopping performance can be further improved by controlling the state of a cross section of the water-stopping portion 4 in the exposed portion 10. Hereunder, a preferred state of a cross section of the water-stopping portion 4 in the exposed portion 10 will be described. A cross section of the water-stopping portion 4 taken perpendicular to the longitudinal axis direction of the insulated electric wire 1 at a position of the exposed portion 10 will be described, but a preferable cross section should be taken at an intermediate position of the exposed portion 10 that is sufficiently distanced away from the waterproof end E1 and the non-waterproof end E2.

Figure 4:
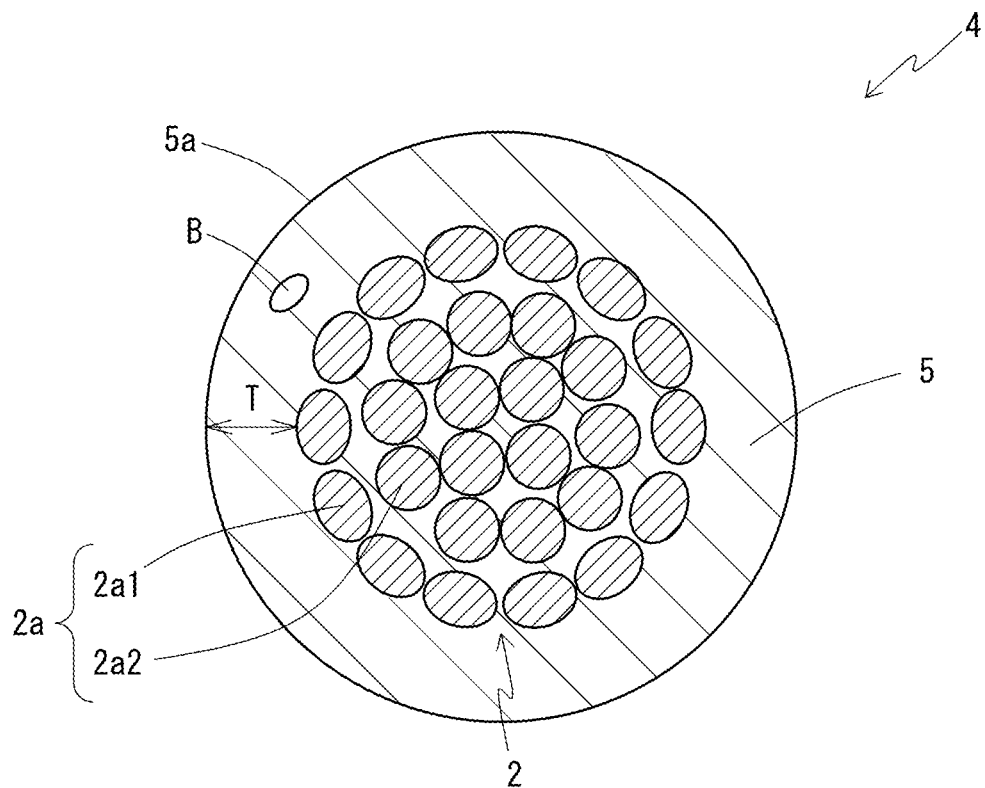
FIG. 4 is a cross-sectional view illustrating a water-stopping portion in which a water-stopping agent does not include any bubble that is in contact with a elemental wire.

As shown in FIG. 4, in an area enclosed by a surface 5a of the water-stopping agent 5 in the water-stopping portion 4, the surfaces of the elemental wires 2a are preferably in contact with the water-stopping agent 5 or another elemental wire 2a. In other words, preferably, the surface of each elemental wire 2a contained in the conductor 2 is in contact with either the water-stopping agent 5 or another elemental wire 2a adjacent to the elemental wire 2a, and is not in contact with any substance other than the water-stopping agent 5 and the constituent material of the elemental wires 2a, such as bubbles B filling a defect portion of the water-stopping agent 5 with air, and liquid bubbles formed as a result of a liquid such as water entering the bubble B. Preferably, the water-stopping agent 5 densely fills up the gaps between the elemental wires 2a and adheres to the surface of the elemental wires 2a without the interposition of any bubble B or the like.

This configuration is unlikely to cause situations where water enters an area between the elemental wires 2a via a bubble B from the outside of the water-stopping portion 4, and where, for example, damage that may serve as an entry path of water occurs due to the bubble B when an external force is applied. Thus, in the water-stopping portion 4, the water-stopping agent 5 adhering to the surfaces of the elemental wires 2a can particularly effectively prevent entry of water into an area between the elemental wires 2a. It is also possible to effectively prevent water that has entered an area between the elemental wires 2a in one portion of the insulated electric wire 1, such as the wire terminal of the non-waterproof-side covered portion 20b, from moving to another portion of the insulated electric wire 1, such as the waterproof-side covered portion 20a, along the elemental wires 2a.

Here, the surface of a elemental wire 2a may be in contact with the water-stopping agent 5 or another elemental wire 2a, but a better water-stopping performance can be realized when the surface is in contact only with the water-stopping agent 5, because by directly adhering to the elemental wire 2a, the water-stopping agent 5 particularly effectively prevents the elemental wire 2a from coming into contact with water. However, also when the surface of a elemental wire 2a is in contact with another elemental wire 2a, water cannot enter a contact interface between the two adjacent elemental wires 2a that are in contact with each other, and a sufficiently good water-stopping performance can be ensured. Due to the absence of bubbles B that are in contact with the elemental wires 2a, the positional relationship between the adjacent elemental wires 2a hardly changes, and a state in which water cannot enter the contact interface between the adjacent elemental wires 2a is maintained.

The cross section of the water-stopping portion 4 may include bubbles B that are not in contact with any elemental wire 2a but are surrounded over their entire circumference by the water-stopping agent 5, rather than bubbles B that are in contact with a elemental wire 2a. Ideally, it is preferable that no kind of bubble B is included in the area enclosed by the surface 5a of the water-stopping agent 5, but even if there is a bubble B, this will not significantly reduce the water-stopping performance of the water-stopping portion 4 as long as the bubble B is not in contact with a elemental wire 2a. For example, there may be bubbles B whose entire circumference is surrounded by the water-stopping agent 5 on the outer side of the area constituted by the conductors 2. Also, in the configuration shown in FIG. 4, there is such a bubble B whose entire circumference is surrounded by the water-stopping agent 5 on the outer side of the conductor 2.

As described above, bubbles B that are in contact with a elemental wire 2a are a cause of a reduction in the water-stopping performance, but if, for example, the required level of water-stopping performance is low, the water-stopping performance and the waterproofing performance of the insulated electric wire 1 may not be largely affected by the bubble B, despite of the presence of bubbles B that are in contact with a elemental wire 2a, as long as the amount or the size of such bubbles B is small. For example, in a cross section of the water-stopping portion 4, it is preferable that the sum of the cross-sectional areas of bubbles B that are in contact with the elemental wires 2a be 5% or lower of the sum of the cross-sectional areas of the elemental wires 2a. It is also preferable that the cross-sectional area of each bubble B that is in contact with a elemental wire 2a be 80% or lower of the cross-sectional area of one elemental wire 2a. On the other hand, even bubbles B whose entire circumference is surrounded by the water-stopping agent 5 and that are not in contact with a elemental wire 2a may affect the water-stopping performance of the water-stopping portion 4, if they locate close to the elemental wire 2a. Accordingly, it is preferable that a bubble B and a elemental wire 2a be provided at a distance of 30% or higher of the diameter of the elemental wire 2a, and the space therebetween be filled with the water-stopping agent 5.

Furthermore, it is preferable that, in a cross section of the water-stopping portion 4, the elemental wires 2a located in the outer circumferential portion of the conductor 2 have a more flattened shape than the elemental wires 2a located inward thereof. In FIG. 4, elemental wires 2a1 located in the outer circumferential portion of the conductor 2 have a flattened and substantially ellipsoidal cross-section. Elemental wires 2a2 located inward of the elemental wires 2a1, which are located in the outer circumferential portion of the conductor 2, have a less flattened cross-section. The cross section taken perpendicular to the axial direction of each elemental wires 2a itself is substantially circular, and thus the flattened cross-sectional shape of the water-stopping portion 4 is obtained by the arrangement of the elemental wires 2a in the conductor 2, rather than the cross-sectional shape of each elemental wires 2a itself, as will be described below.

If the elemental wires 2a constituting the conductor 2 are twisted in a gentle spiral shape with a relatively small inclination angle, the axial direction of the elemental wires 2a is oriented in a direction close to the longitudinal axis direction of the insulated electric wire 1, and thus a cross section of the elemental wire 2a taken perpendicular to the longitudinal axis direction of the insulated electric wire 1 has a shape that is substantially circular and is less flattened. By contrast, if the elemental wires 2a constituting the conductor 2 are twisted in a steep spiral shape with a relatively large inclination angle, the axial direction of the elemental wires 2a is oriented in a direction largely inclined with respect to the longitudinal axis direction of the insulated electric wire 1, and thus if a elemental wire 2a is cut perpendicular to the longitudinal axis direction of the insulated electric wire 1, the elemental wire 2a will be cut at an angle with respect to the axis direction of the elemental wire 2a. Accordingly, the cross section of the elemental wire 2a has a flattened shape that can be approximated to an ellipse. Thus, the above description of the elemental wires 2a1 located in the outer circumferential portion of the conductor 2 in the cross section of the water-stopping portion 4 having a more flattened shape than the elemental wires 2a2 located inward thereof means that the elemental wires 2a1 located in the outer circumferential portion of the conductor 2 are twisted in a steep spiral shape with a large inclination angle, compared to the spiral shape of the inner elemental wires 2a2.

As described above, the water-stopping portion 4 can be formed by filling the areas between the elemental wires 2a with the water-stopping agent 5 in a high flowability state, and then decreasing the flowability, and by twisting the elemental wires 2a1 located in the outer circumferential portion of the conductor 2 in a steep spiral state with a large inclination angle with the areas between the elemental wires 2a filled with the water-stopping agent 5 in a high flowability state, the water-stopping agent 5 filling up the areas is unlikely to drop or flow to the outside of the conductor 2, and stay in the areas between the elemental wires 2a with high uniformity. As a result, the areas between the elemental wires 2a are filled with a sufficient amount of water-stopping agent 5, and a water-stopping portion 4 having a superior water-stopping performance is easily formed. Specifically, when, as will be described later as a method for producing the insulated electric wire 1, a production method is used in which the distances between the elemental wires 2a in the exposed portion 10 are increased while unwinding the elemental wires 2a from the covered portions 20a and 20b to the exposed portion 10, and in this state, the gaps between the elemental wires 2a are filled with the water-stopping agent 5, and after the filling step, the distances between the elemental wires 2a in the exposed portion 10 are reduced to decrease the twist pitch of the elemental wires 2a (retightening), the cross-sectional shape of the elemental wires 2a1 in the outer circumferential portion of the conductor 2 is likely to be flattened, and thus advantageous in that the water-stopping agent 5 is easily held in the gaps between the elemental wires 2a. Thus, the feature of the elemental wires 2a1 in the outer circumferential portion of the conductor 2 having a flattened cross-sectional shape is an indicator used when a water-stopping portion 4 having a superior water-stopping performance is formed. Furthermore, as described above, by filling the gaps between the elemental wires 2a in the exposed portion 10 with the water-stopping agent 5, and then retightening the twist of the conductor in the exposed portion 10, the diameter of the conductor 2 at the end (non-waterproof end E2) of the non-waterproof-side covered portion 20b is reduced, and a void 31 is likely to be formed between the conductor 2 and the insulation covering 3. Therefore, the feature of the elemental wires 2a1 located in the outer circumferential portion of the conductor 2 having a flattened cross-sectional shape can serve as an indicator for a superior water-stopping performance of the water-stopping portion 4, and can serve at the same time an indirect indicator for facilitation of drainage of water by securing a sufficient void 31.

An ellipticity can be used as a specific indicator for evaluating the level of flatness of the cross-sectional shape of the elemental wires 2a. The ellipticity is obtained by dividing the length of the short axis (short diameter) of a cross-sectional shape by the length of the long axis (long diameter), i.e. (short diameter/long diameter). The smaller the value of the ellipticity is, the more flattened the cross-sectional shape is. In a cross section of the water-stopping portion 4, the ellipticity of the elemental wires 2a1 located in the outer circumferential portion of the conductor 2 preferably has a value less than the value of the ellipticity of the elemental wires 2a2 located inward thereof. Furthermore, the ellipticity of the elemental wires 2a1 located in the outer circumferential portion of the conductor 2 is preferably 0.95 or lower. This brings about an effect of configuring the water-stopping portion 4 in which a sufficient amount of water-stopping agent 5 is held between the elemental wires 2a, and has a superior water-stopping performance. On the other hand, the ellipticity of the elemental wires 2a1 located in the outer circumferential portion of the conductor 2 is preferably 0.50 or higher. This makes it possible to suppress a difference in the actual length between the elemental wires 2a1 located in the outer circumferential portion of the conductor 2 and the elemental wires 2a2 located inward thereof within a range in which the above-described effect of improving the water-stopping performance is not saturated.

It is preferable that in a cross section of the water-stopping portion 4, the ellipticity of the elemental wires 2a1 located in the outer circumferential portion of the conductor 2 be smaller than the ellipticity of the elemental wires 2a2 located inward thereof, and the ellipticities of the elemental wires 2a1 and 2a2 in a cross section of the water-stopping portion 4, particularly, the ellipticity of the elemental wires 2a1 located in the outer circumferential portion be smaller than the values of the ellipticities of the elemental wires 2a in cross sections of the covered portions 20a and 20b (specifically, the remote areas 22) that are taken perpendicular to the longitudinal axis direction of the insulated electric wire 1. This means that the twist pitch of the elemental wires 2a is smaller in the exposed portion 10 constituting the water-stopping portion 4 than in the covered portions 20a and 20b. As described above, with the production method in which the distances between the elemental wires 2a in the exposed portion 10 are increased, and in this state, the gaps between the elemental wires 2a are filled with the water-stopping agent 5, and after the filling step, the distances between the elemental wires 2a in the exposed portion 10 are reduced to decrease the twist pitch of the elemental wires 2a (retightening), an advantageous effect of easily holding the water-stopping agent 5 in the gaps between the elemental wires 2a is realized. Also, by decreasing the twist pitch of the elemental wires 2a in the exposed portion 10 relative to the twist pitch in the covered portions 20a and 20b in the retightening step, the effect of holding the water-stopping agent 5 in the gaps between the elemental wires 2a is particularly improved. Accordingly, the feature of the ellipticity of the elemental wires 2a in a cross-section being smaller in the exposed portion 10 than in the covered portions 20a and 20b functions as a good indicator for use when the water-stopping portion 4 having a superior water-stopping performance is formed.

Furthermore, a water-stopping agent filling rate can be used as an indicator for evaluating whether or not the gaps between elemental wire 2a in the water-stopping portion 4 are filled with a sufficient amount of water-stopping agent 5. A water-stopping agent filling rate is defined as a ratio of an area (A1) of a region between the elemental wires 2a filled with the water-stopping agent 5 to an area (A0) of a region enclosed by the conductor 2 in a cross section of the water-stopping portion 4 (A1/A0×100%). For example, in a cross section of the water-stopping portion 4, using the area (A0) of the polygonal region obtained by connecting the centers of the elemental wires 2a1 located in the outer circumferential portion of the conductor 2 together as a reference, a water-stopping agent filling rate can be calculated as a ratio of the area (A1) of the region filled with the water-stopping agent 5 to the area (A0). For example, if the water-stopping agent filling rate is 5% or higher, and specifically 10% or higher, it is conceivable that the gaps between the elemental wires 2a are filled with an amount of water-stopping agent 5 that is sufficient for ensuring a superior water-stopping performance. On the other hand, the water-stopping agent filling rate is preferably kept at 90% or lower, in view of avoiding the use of an excessive amount of water-stopping agent 5.

Also, as described above, the surface of a elemental wire 2a is preferably not in contact with any bubble B. The surface of a elemental wire 2a may be in contact with the water-stopping agent 5 or may be in contact with another elemental wire 2a, but it is preferable that the surface be in contact only with the water-stopping agent 5 in view of easily ensuring a superior water-stopping performance. Based on this view, in a cross section of the water-stopping portion 4, the sum of the lengths of the portions in the circumference of the elemental wires 2a that are not in contact with any bubble B or adjacent elemental wires 2a but are in contact with the water-stopping agent 5 is preferably 80% or higher of the sum of the circumferential lengths of all the elemental wires 2a. Also, since it is easier to fill a gap between elemental wires 2a with the water-stopping agent 5 when the distance between the adjacent elemental wires 2a is sufficiently large, it is preferable that a cross section of the water-stopping portion 4 include a portion that is constituted by the water-stopping agent 5 and in which the distance between adjacent elemental wires 2a is at least 30% or higher the outer diameter of the elemental wires 2a.

Wire Harness

Figure 5:
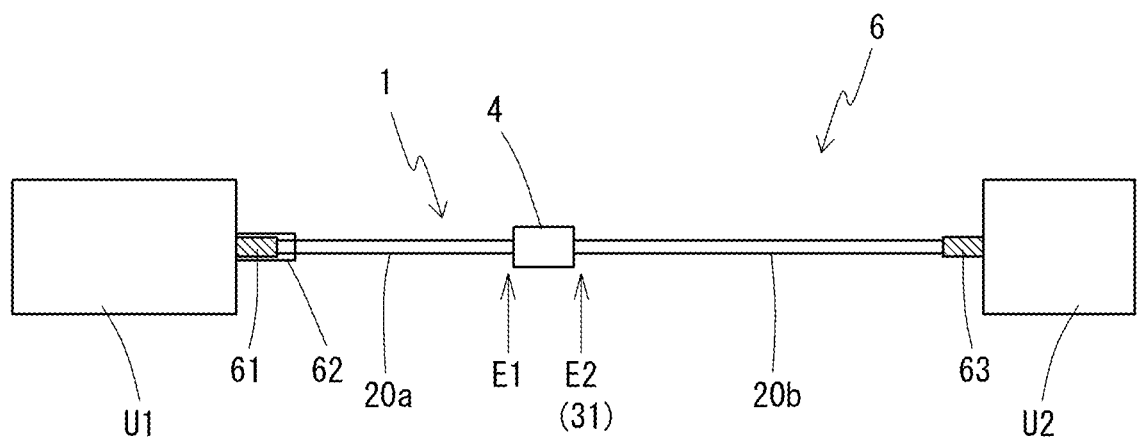
FIG. 5 is a schematic side view illustrating a wire harness according to an embodiment of the present invention, together with devices connected to both ends of the wire harness.

Hereinafter, a wire harness according to an embodiment of the present disclosure will be described. FIG. 5 illustrates the wire harness 6 according to an embodiment of the present disclosure. The wire harness 6 contains the above-described insulated electric wire 1 according to the embodiment of the present disclosure. The insulated electric wire 1 constituting the wire harness 6 is provided with, at the respective ends thereof, electric connection members 61 and 63 such as connectors that are capable of connecting to other devices U1 and U2. The wire harness 6 may contain, in addition to the above-described insulated electric wire 1 according to the embodiment, another type of insulated electric wire (not shown).

The wire harness 6 may employ any type of electric connection members 61 and 63 provided at the respective ends of the insulated electric wire 1, and any type of devices U1 and U2 to which the electric connection members 61 and 63 are connected. But, an appropriate insulated electric wire 1 is such that one end thereof is waterproof while the other end is not waterproof, in view of efficient use of the water-stopping performance of the water-stopping portion 4.

Specifically, as shown in FIG. 5, the exposed portion 10 in which the conductor 2 is exposed is formed in a middle portion of the insulated electric wire 1 constituting the wire harness 6, and the water-stopping portion 4 filled with the water-stopping agent 5 is formed in an area including this exposed portion 10. Also, of both terminals of the insulated electric wire 1 with the water-stopping portion 4 interposed therebetween, the wire terminal of the waterproof-side covered portion 20a contains the waterproof connection member 61 having the waterproof structure 62 for preventing entry of water from the outside. As the waterproof structure 62, for example, a rubber closure for sealing the space between a connector housing and a connector terminal is provided in a connector constituting the waterproof connection member 61. With the waterproof structure 62, even if water adheres to the surface or the like of the waterproof connection member 61, the water is unlikely to enter the waterproof connection member 61. That is to say, water is unlikely to enter the waterproof-side covered portion 20a. On the other hand, the wire terminal of the non-waterproof-side covered portion 20b located opposite across the water-stopping portion 4 includes the non-waterproof connection member 63 without any waterproof structure as contained in the waterproof connection member 61. Accordingly, if water adheres to the surface or the like of the non-waterproof connection member 63, the water can enter the non-waterproof connection member 63. The water can further enter the non-waterproof-side covered portion 20b.

The wire harness 6 containing electric connection members 61 and 63 at both ends of the insulated electric wire 1 can be used to electrically connect two devices U1 and U2. For example, the first device U1 to which the waterproof connection member 61 having the waterproof structure 62 is connected may be a device such as an electric control unit (ECU) that requires waterproofing. On the other hand, the second device U2 to which the non-waterproof connection member 63 without any waterproof structure is connected may be a device that does not require waterproofing.

Since the insulated electric wire 1 constituting the wire harness 6 contains the water-stopping portion 4, even if water that has externally entered the wire harness 6 moves along the elemental wires 2a constituting the conductor 2, it is possible to suppress the movement of the water along the insulated electric wire 1 from progressing beyond the water-stopping portion 4. That is to say, it is possible to suppress external water from moving beyond the water-stopping portion 4, reaching the electric connection members 61 and 63 at both ends, and further entering the devices U1 and U2 connected to the electric connection members 61 and 63. For example, even if water adhering to the surface of the non-waterproof connection member 63 without any waterproof structure enters the non-waterproof connection member 63, and moves along the insulated electric wire 1 via the elemental wires 2a constituting the conductor 2 of the non-waterproof-side covered portion 20b, the movement of the water is stopped by the water-stopping agent 5 with which the water-stopping portion 4 is filled. As a result, the water cannot move to the side of the waterproof-side covered portion 20a on which the waterproof connection member 61 is provided beyond the water-stopping portion 4, and cannot enter the waterproof connection member 61 and the first device U1. By suppressing water movement by the water-stopping portion 4 in this way, it is possible to efficiently use the waterproof characteristic of the waterproof structure 62 with respect to the waterproof connection member 61 and the device U1.

The effect of suppressing movement of water using the water-stopping portion 4 provided on the insulated electric wire 1 is realized regardless of the position at which the water adheres, the cause thereof, the environment when the water adheres, or the situation after the water adheres. For example, when the wire harness 6 is installed in an automobile, water that has entered the non-waterproof-side covered portion 20b such as a gap between the elemental wires 2a from the non-waterproof connection member 63 can be efficiently prevented from moving to the waterproof-side covered portion 20a and further entering the waterproof connection member 61 having the waterproof structure 62 and the first device U1 due to cold breathing. "Cold breathing" refers to a phenomenon in which when the waterproof connection member 61 having the waterproof structure 62 and the first device U1 are heated when the automobile is driven for example, and then heat is discharged, the pressure on the waterproof connection member 61 side becomes lower and the pressure on the non-waterproof connection member 63 side becomes relatively higher, so that a difference in pressure occurs along the insulated electric wire 1, and water adhering to the non-waterproof connection member 63 climbs toward the waterproof connection member 61 and the first device U1.

Furthermore, since in the area of the insulated electric wire 1 in which the water-stopping portion 4 is formed, the void 31, which is not filled with the water-stopping agent 5, is formed in a boundary portion between the non-waterproof-side covered portion 20b and the exposed portion 10, even if water adhering to the surface of the non-waterproof connection member 63 enters the non-waterproof-side covered portion 20b, the water can escape by flowing or vaporizing not only from a position of the non-waterproof connection member 63 connected to one end of the non-waterproof-side covered portion 20b but also from the void 31 formed in the other end. Specifically, if water climbs from the non-waterproof connection member 63 to the side on which the water-stopping portion 4 is provided along the non-waterproof-side covered portion 20b due to capillary action or cold breathing, the void 31 is located at a position to which the water will move, and thus the water can be efficiently discharged from the void 31. As a result, the water that has entered the non-waterproof-side covered portion 20b from the non-waterproof connection member 63 is unlikely to stay inside the non-waterproof-side covered portion 20b for a long period of time. Accordingly, on the non-waterproof side, the constituent member of the insulated electric wire 1 such as the conductor 2, the constituent member of the non-waterproof connection member 63, or the second device U2 to which the non-waterproof connection member 63 is connected are unlikely to become defective due to adverse effects of water, such as corrosion, denaturation, or malfunction that may be caused by long term contact with water. The non-waterproof connection member 63 and the second device U2 are supposed to be used in a non-waterproof environment, and are not supposed to be continuously in long term contact with water, although they are designed to be unaffected by a certain level of contact with water. Thus, it is preferable that water that has entered the non-waterproof-side covered portion 20b be discharged as early as possible.

There is no particular limitation to the specific position and number of the water-stopping portions 4 that are formed in the insulated electric wire 1 constituting the wire harness 6. However, at least one water-stopping portion 4 is preferably provided at a position closer to the waterproof connection member 61 than to the non-waterproof connection member 63, in view of effectively suppressing the effects of water on the waterproof connection member 61 in which the waterproof structure 62 is formed.

Method for Producing Insulated Electric Wire

The following will briefly describe an example of a method for producing the above-described insulated electric wire 1 according to an embodiment of the present disclosure. First, the insulation covering 3 is removed and the conductor 2 is exposed at a middle portion of continuous linear insulated electric wire 1, so that an exposed portion 10 is formed. Portions adjacent to both sides of the exposed portion 10 constitute the covered portions 20a and 20b.

Then, the distances between the elemental wires 2a in the exposed portion 10 are increased so that it is easy to densely fill the gaps between the elemental wires 2a with the water-stopping agent 5. At this time, preferably, the conductor 2 is once twisted in a direction of tightening the twist of the elemental wires 2a and the conductor 2 is unwound from the covered portions 20a and 20b toward the exposed portion 10. Subsequently, the conductor 2 is twisted in the opposite direction, so that the twist of the elemental wires 2a is loosened. With this, the twist of the conductor 2 unwound from the covered portions 20a and 20b to the exposed portion 10 by the twist tightening is loosened in the exposed portion 10, and the elemental wires 2a having long actual lengths are arranged while being bent within the area of the exposed portion 10. Accordingly, large gaps are secured between the elemental wires 2a. Preferably, such an operation of widening the gaps between the elemental wires 2a is performed not only in the exposed portion 10 but also over an area ultimately becomes the waterproof end E1 of the waterproof-side covered portion 20a.

After the gaps between the elemental wires 2a have been widened in the exposed portion 10, the gaps are then filled with the water-stopping agent 5. At this time, the water-stopping agent 5 is kept in a high flowability state. For filling, a curable resin composition in an uncured state may be used, for example. The filling operation with the water-stopping agent 5 may be performed by an appropriate method such as application, immersion, dripping, and injection that corresponds to such properties of the water-stopping agent 5 as viscosity. At this time, the filling operation is preferably performed while the insulated electric wire 1 rotates around its axis, in order to place the water-stopping agent 5 with high uniformity. The water-stopping agent 5 is preferably placed not only in the gaps between the elemental wires 2a but also in the outer circumferential area of the conductor 2, which is an assembly of the elemental wires 2a. Specifically, if a jet device for injecting the water-stopping agent 5 is used and a predetermined position of the insulated electric wire 1 is immersed into the water-stopping agent 5, the water-stopping agent 5 easily fills the gaps between the elemental wires 2a with high uniformity, effectively suppressing the number and the sizes of bubbles B that may be formed in the water-stopping portion 4.

In order to form the waterproof end E1 in the portion of the exposed portion 10 that is adjacent to the waterproof-side covered portion 20a, when the exposed portion 10 is filled with the water-stopping agent 5, it is preferable to place the water-stopping agent 5 to at least a position at the boundary with the insulation covering 3. If possible, it is preferable that the water-stopping agent 5 permeates into an area inside the insulation covering 3. On the other hand, in order to reliably form the non-waterproof end E2 in which a void 31, which is not filled with the water-stopping agent 5, is left in the portion of the exposed portion 10 that is adjacent to the non-waterproof-side covered portion 20b, it is preferable not to place the water-stopping agent 5 to a position at the end edge of the insulation covering 3, and leave an area (non-waterproof conductor zone S) that is not filled with the water-stopping agent 5 at an end of the exposed portion 10.

After the water-stopping agent 5 has been placed, it is preferable to perform the retightening before the water-stopping agent 5 becomes less flowable and is cured. That is to say, the insulated electric wire 1 is twisted in the direction of tightening the twist of the elemental wires 2a, and the twist in the exposed portion 10 loosened before the filling with the water-stopping agent 5 is retightened. With this retightening, the gaps between the elemental wires 2a are narrowed in the exposed portion 10, and the water-stopping agent 5 is likely to stay in the gaps between the elemental wires 2a. By performing the retightening step, rearrangement of the water-stopping agent 5 with which the areas between the elemental wires 2a are filled is facilitated, and the uniformity in the distribution of the water-stopping agent 5 is improved. For example, even if bubbles B are generated in the water-stopping agent 5 filling up the area, the water-stopping agent 5 may move during the execution of the retightening step, and the bubbles B may be filled and eliminated by the water-stopping agent 5 that has moved to from the surrounding portion. When the filling with the water-stopping agent 5 is performed by immersion using the jet flow device or the like, the retightening step is preferably performed while the insulated electric wire 1 is immersed in the water-stopping agent 5.

It is desirable to perform the retightening until the conductor diameter in the exposed portion 10 is smaller than that in the remote areas 22 of the two covered portions 20a and 20b, which are not affected by the processing for forming the water-stopping portion 4. With this, the conductor diameter is also likely to be smaller in the adjacent areas 21 of the two covered portions 20a and 20b that are adjacent to the exposed portion 10 than that in the remote areas 22, due to the continuity of the conductor 2. As a result of the non-waterproof end E2 formed in the adjacent areas 21 in which the conductor diameter is small, a sufficiently large space that is to function as a void 31 is likely to be formed between the conductor 2 and the insulation covering 3.

Furthermore, in addition to performing retightening, the insulation covering 3 constituting the waterproof-side covered portion 20a is preferably moved slightly toward the exposed portion 10, before the water-stopping agent 5 becomes less flowable and is cured. With this movement, it is easy to fill the area between the insulation covering 3 and the conductor 2 at the end of the waterproof-side covered portion 20a with the water-stopping agent 5. It is also easy to place the water-stopping agent 5 on the outer side of the insulation covering 3. With this operation, it is easy to form, at the waterproof end E1, a water-stopping portion 4 that can effectively prevent entry of water. The non-waterproof-side covered portion 20b is preferably not subjected to the same movement of the insulation covering 3, in view of reliably leaving a void 31, which is not filled with the water-stopping agent 5, between the insulation covering 3 and the conductor 2.

Then, a method that corresponds to the type of the water-stopping agent 5 may be used to reduce the flowability of the water-stopping agent 5, and cure the water-stopping agent 5. If the water-stopping agent 5 has light curability for example, light irradiation may be performed on the outer circumference at the position at which the water-stopping agent 5 is placed. At this time, by curing the water-stopping agent 5 while rotating the insulated electric wire 1 around its axis, the uniformity in placing the water-stopping agent 5 is likely to be improved. If a protection member is provided around the outer circumference of the water-stopping portion 4, the protection member may be provided after the curing, as appropriate, by wrapping a tape material around the water-stopping portion 4, for example.

After the completion of the above-described processes, it is possible to simply realize a structure in which the exposed portion 10 is formed in the middle portion of the insulated electric wire 1, and the water-stopping portion 4 is further formed in this exposed portion 10. Furthermore, it is possible to form, on one end side of the exposed portion 10, the waterproof end E1 for preventing entry of water into the covered portion 20a using the water-stopping agent 5, and form, on the other end side, the non-waterproof end E2 in which a void 31, which is not filled with the water-stopping agent 5, is left between the elemental wires 2a or between the insulation covering 3 and the conductor 2, and water can escape therethrough.

As described above, before filling the exposed portion 10 with the water-stopping agent 5, the steps of once tightening the twist of the elemental wires 2a to unwind the elemental wires 2a from the covered portions 20a and 20b, and loosening the twist of the elemental wires 2a are performed, and after the filling with the water-stopping agent 5, the step of further tightening the twist of the elemental wires 2a is performed. As a result, it is easy to realize the above-described structure in which the conductor diameter is smaller in the exposed portion 10 and the adjacent areas 21 than in the remote areas 22. Also, the density of the metal material per unit length is likely to have a distribution such that the exposed portion 10 has the highest density, the remote areas 22 have the next highest density, and the adjacent areas 21 have the lowest density. The fact that the exposed portion 10 has a high density of the metal material means that the elemental wires 2a having large actual lengths are arranged in the exposed portion 10, and it is easy to fill the gaps between the elemental wires 2a densely with the water-stopping agent 5. Furthermore, the twist pitch of the elemental wires 2a is likely to have a distribution such that the exposed portion 10 has the smallest twist pitch, the remote areas 22 have the next smallest twist pitch, and the adjacent areas 21 have the largest twist pitch. Correspondingly to the twist pitch, the distance between the elemental wires 2a is likely to be such that the distance is smallest in the exposed portion 10, is the next smallest in the remote areas 22, and is the largest in the adjacent areas 21. Since in the exposed portion 10, the twist pitch of the elemental wires 2a is small and the distance between the elemental wires 2a is small, it is easy to densely hold the water-stopping agent 5 in the gaps between the elemental wires 2a, and form a water-stopping portion 4 that includes a smaller number of bubbles B. Furthermore, in a cross-section of the water-stopping portion 4, the elemental wires 2a1 located in the outer circumferential portion of the conductor 2 are likely to have a more flattened shape than the elemental wires 2a2 located inward thereof, and the ellipticity of the elemental wires 2a in a cross section taken perpendicular to the longitudinal axis direction of the insulated electric wire 1 is likely to be smaller in the water-stopping portion 4 than in the covered portions 20a and 20b.

Embodiments of the present invention have been described in detail but the present invention is in no way restricted to the embodiments described above and can be modified variously in a range without departing from the gist of the present invention.

LIST OF REFERENCE NUMERALS 1, 1' Insulated electric wire
2 Conductor
2a Elemental wire
2a1 Elemental wire located in outer circumferential portion of conductor
2a2 Elemental wire located inward of the elemental wire 2a1
3 Insulation covering
4 Water-stopping portion
5 Water-stopping agent
6 Wire harness
10, 10' Exposed portion
20a Waterproof-side covered portion (first covered portion)
20b Non-waterproof-side covered portion (second covered portion)
20' Covered portion
21 Adjacent area
22 Remote area
31 Void
61 Waterproof connection member
62 Waterproof structure
63 Non-waterproof connection member B Bubble
E1 Waterproof end
E2 Non-waterproof end
S Non-waterproof conductor zone

The invention claimed is:

1. An insulated electric wire comprising:
a conductor in which a plurality of elemental wires made of a metal material are twisted together; and
an insulation covering that covers an outer circumference of the conductor;
wherein the insulated electric wire further comprises:
an exposed portion in which the insulation covering is removed from the outer surface of the conductor; and
a first covered portion and a second covered portion in which the insulation covering covers the outer circumference of the conductor,
the first covered portion, the exposed portion, and the second covered portion being adjacent to each other in a direction of a longitudinal axis of the insulated electric wire in this order,
a water-stopping portion being further provided in at least an area extending from a part of the exposed portion to a part of the first covered portion, gaps between the elemental wires in the water-stopping portion being filled with a water-stopping agent, and
a region of the second covered portion that is adjacent to the exposed portion being a non-waterproof end that has a void between the conductor and the insulation covering, wherein
in the second covered portion, an outer diameter of the conductor is smaller in an area of the non-waterproof end adjacent to the exposed portion than in a remote area that is distanced from the exposed portion.

2. The insulated electric wire according to claim 1, wherein the second covered portion also has the void between the elemental wires.

3. The insulated electric wire according to claim 1, wherein a region of the first covered portion that is adjacent to the exposed portion is a waterproof end in which a gap between the conductor and the insulation covering is filled with the water-stopping agent.

4. The insulated electric wire according to claim 3, wherein an outer circumference of the insulation covering at the waterproof end is covered by the water-stopping agent, continuously from the gap between the insulation covering and the conductor filled with the water-stopping agent,
an outer circumference of the insulation covering at the non-waterproof end is not covered by the water-stopping agent, and
the exposed portion contains, at a position adjacent to the non-waterproof end, a zone in which the water-stopping agent is not placed on the outer circumference of the conductor.

5. The insulated electric wire according to claim 1, wherein the outer diameter of the conductor is smaller in the exposed portion than in the remote area.

6. A wire harness comprising:
the insulated electric wire according to claim 1; and
electric connection members provided at both ends of the insulated electric wire, the electric connection members being capable of connecting to another device.

7. The wire harness according to claim 6, wherein the electric connection member provided on the first covered portion side contains a waterproof structure for preventing entry of water from the outside, and
the electric connection member provided on the second covered portion side does not contain any waterproof structure.

* * * * *